June 6, 1939. F. G. HOERR 2,161,624
DIVIDING WALL FOR PANS
Filed July 10, 1937

INVENTOR.
Frederick G. Hoerr.
BY
ATTORNEY.

Patented June 6, 1939

2,161,624

UNITED STATES PATENT OFFICE 2,161,624

DIVIDING WALL FOR PANS

Frederick G. Hoerr, St. Louis, Mo.

Application July 10, 1937, Serial No. 152,880

2 Claims. (Cl. 53—6)

My invention relates to a baking pan, and, more particularly to a dividing wall therefor.

The object of my present invention is the provision of a longitudinally adjustable dividing wall for standard baking pans used by commercial bakers to divide the interior of the pan into a plurality of compartments.

A further object of the invention resides in the provision of a dividing wall for baking, or other pans, whereby the interior of the pan may be divided into two, or more compartments so that two, or more kinds of merchandise can be baked at the same time.

A further object of the invention resides in a dividing wall structure for pans so that the interior of the pan can be divided into a number of different compartments to display several kinds of cakes, candies, etc., in a single pan.

A still further object of the invention is the provision of a dividing wall for pans, which possesses advantages in points of simplicity and efficiency, and, at the same time proves itself comparatively inexpensive in cost of manufacture.

With the above and other objects in view, the invention consists in the novel features of construction, arrangement and combination of parts hereinafter more fully described and finally pointed out in the claims hereto appended.

Referring to the accompanying drawing forming a part of this specification, wherein like characters of reference denote similar parts throughout the several views.

Figure 1:
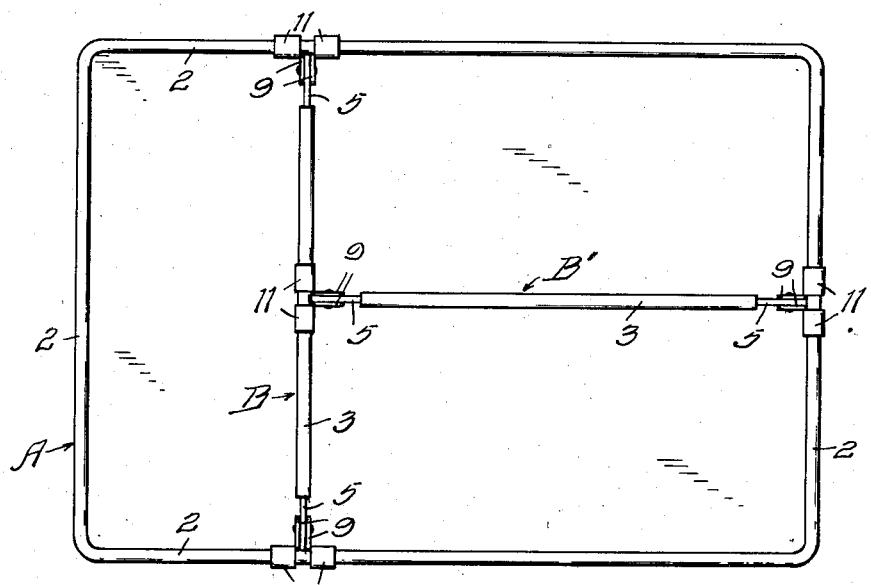
Fig. 1 is a top plan view of a baking pan provided with two dividing walls embodying the features of my invention.

Referring to the drawing, the reference character A designates generally, a baking pan, such as used by bakers, and having the side walls 1 provided with upper rolled edges 2.

The reference characters B designates, generally, a dividing wall or partition, which is adapted to be mounted in the pan between opposed side walls thereof for dividing the interior of the pan into two independent baking compartments, instead of one baking compartment.

Figure 2:
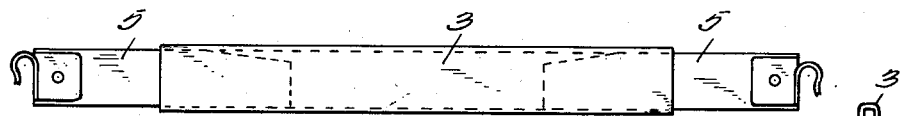
Fig. 2 is a side elevation of the dividing wall.
Figure 3:
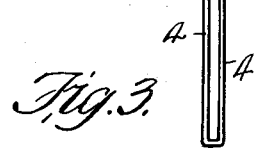
Fig. 3 is an end view of the tubular member of the dividing wall.

The dividing wall B, as illustrated in Fig. 2, embodies a hollow, or tubular wall member 3, which is open at both ends. As shown in Fig. 3, the member 3 has its side walls 4 spaced apart, in parallel relation, and, they are flat, as illustrated. A pair of flat blade-like wall members designated 5 are employed, and they have telescopic connection with the ends of the hollow dividing wall member 3. The upper inner edge of each longitudinally slidable blade-like wall member 5 is suitably beveled, as at 6, so that when the dividing wall is in an extended position, the blade-like members 5 are permitted to flex downwardly relative to the hollow wall member 3 to accommodate variations in the bottom wall of the pan when said bottom wall is not flat, but bulged upwardly, as is usual after they have been in service for some time. The height of the dividing wall is higher than the side walls of the pan.

Figure 4:
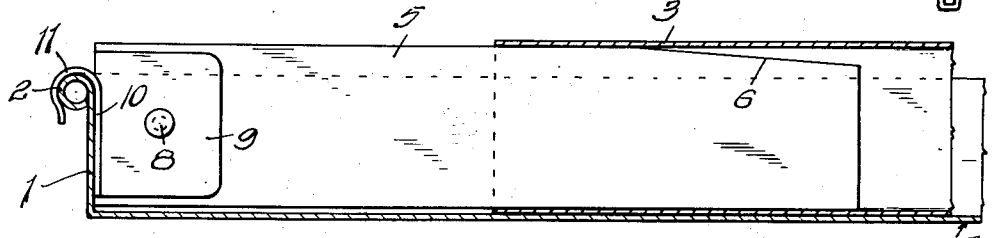
Fig. 4 is a detail showing one end of the dividing wall, partly extended, and shown as attached to one of the side walls of a pan.
Figure 5:
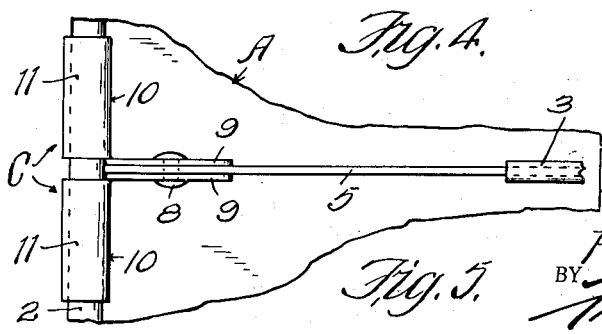
Fig. 5 is a top plan view of Fig. 4.
Figure 6:
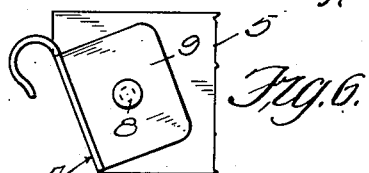
Fig. 6 is a detail, showing the outer end of one of the slidable blade-like members, as beveled to fit a pan having a tapered side wall.

The outer ends of the blade-like wall members 5 may be at right anges to the upper and lower edges of the blade members 5, as shown in Figs. 3 and 4, or they may be beveled as at 7, as shown in Fig. 5, to accommodate different shapes of pans.

A pair of suitable clamping members designated, generally as C, are carried at the outer ends of the blade-like dividing wall members 5. One clamping member, in one embodiment thereof, is pivotally secured, as by a pivot pin 8, to each side face of each blade-like member 5. Each clamping member, in one embodiment thereof, consists of an ear 9, through which the pivot pin passes. The ear lies in contact with the side face of the blade-like dividing wall member and terminates at its outer edge in a right angular wing portion 10, which is adapted for facial contact with the inner wall of one of the side walls of a baking pan, and said wing portion 10 terminates at its upper edge in a flexibly resilient hook shaped portion 11 adapted to be clamped over the upper rolled edge 2 of the baking pan.

The blade-like members 5 being telescopically connected with the hollow dividing wall member 3 it is apparent that the dividing wall proper is longitudinally adjustable to accommodate various inside diameters of baking pans for dividing the single interior of the pan into a plurality of baking compartments.

Where more than two compartments are required, such, for instance, as baking several kinds of rolls, or other bakery goods, an additional dividing wall, designated B', as shown in Fig. 1, can be used, and in such instance, the clamping device on one end of the dividing wall is clamped over the hollow wall section, or member 3 of dividing wall designated B, and the other clamping device clamped over the rolled edges of one of the side walls of the pan.

From the foregoing description, it will be apparent that by the use of my pan divider, there is no need of a series of different size pans, as the pan can be easily and quickly divided to provide the required sizes of baking compartments. Further, it will be apparent that the pan divider can be used with a great saving of fuel, labor and material in the bakery on sweet cake doughs, yeast doughs, loaf cakes, and all kinds of slices, French cheese cakes, etc., and that by the use of my pan divider, eliminate a great deal of danger from burns, for instance when one takes the pan out of an oven.

While I have described the dividing wall in connection with a baking pan, it is apparent that it is equally as useful when used as a dividing wall, or walls when displaying cakes, candies, etc., in pans, in a window, on a counter, or in a case.

The many advantages of the herein described invention will readily suggest themselves to those skilled in the art to which it appertains.

From the foregoing description, it is evident that a simple device for this purpose has been disclosed, but it is to be understood that I do not desire to restrict, or limit myself to the very details of the construction shown and described, which is merely illustrative, it being obvious that changes, not involving the exercise of invention, may be made without conflicting or departing from the spirit of the invention within the scope of the appended claims.

What I claim is:

1. In a removable extension wall for baking pans having an upper rolled edge, in combination, a hollow sheet metal member having flat parallel side walls, said member being open at both ends, a pair of blade-like members having telescopic connection with the ends of said hollow member, the upper edge of each blade-like member being beveled at the inner end portion thereof, a pair of clamping devices each including an ear pivoted centrally thereof to opposite side walls of each blade-like member at the outer ends thereof a wing projecting at a right angle from each ear, and the wing of each ear terminating at its upper end in a hook for detachable connection with the rolled upper edge of the pan.

2. A detachable dividing wall for baking pans having, in combination, an elongated flattened tubular member, a slide member mounted in each end of the tubular member, a portion of the upper edge of each slide member being beveled, an ear pivotally connected centrally thereof to opposite side faces of each slide member at the outer ends thereof, a wing projecting at a right angle away from the outer side edge of each ear, and a flexibly resilient hook formed at the upper end of each wing.

FREDERICK G. HOERR.